Aug. 2, 1955  F. REINGRUBER ET AL  2,714,526
THERMOSTAT
Original Filed Oct. 26, 1945
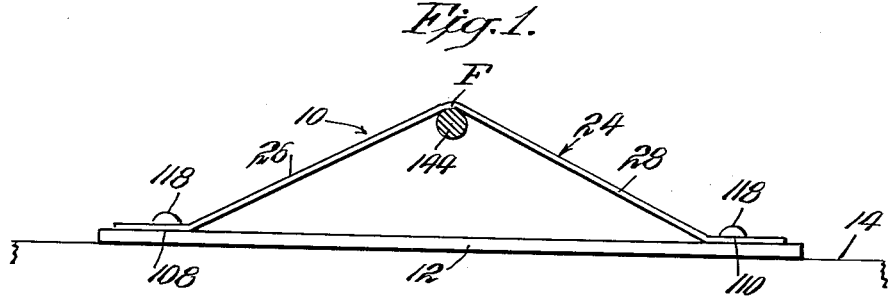
INVENTORS
FRANK REINGRUBER
JOSEPH REINGRUBER
BY
Philip S. McLean
ATTORNEY

United States Patent Office 2,714,526
Patented Aug. 2, 1955

2,714,526
THERMOSTAT

Frank Reingruber, Yonkers, and Joseph Reingruber, Astoria, N. Y.

Original application October 26, 1945, Serial No. 624,674, now Patent No. 2,584,924, dated February 5, 1952. Divided and this application January 5, 1952, Serial No. 265,144

1 Claim. (Cl. 297—11)

This invention relates to thermostats and more particularly to that type in which is employed two metals of dissimilar heat expansion characteristic to actuate a control, whether an electric switch, relay valve or the like and is a division of our application Ser. No. 624,674, filed October 26, 1945, Patent No. 2,584,924, dated February 5, 1952.

Our invention contemplates the provision of a comparatively sensitive thermostat so designed and constructed that the relatively small movement of the expanding metal is translated into a larger, multiplied or magnified movement of the control operating element and therefore provides a thermostat that reacts rapidly to relatively small changes in temperature.

Our invention further contemplates a thermostat of such construction that it may be readily applied in direct contact with the device to the temperature of which the thermostat is designed to react, and thereby one adapted to quickly react to relatively small changes in temperature thereof, thereby increasing the sensitivity of regulation and limiting the tendency of the device to overshoot the temperature for which the thermostat is set.

Our invention still further contemplates the provision of a thermostat which is simple and rugged in construction, that may be conveniently applied as a unit to the article, the temperature of which is to be regulated.

Our invention also contemplates the provision of such a thermostatic unit that is relatively small in size and compact, reliable in operation.

Other and further objects and advantages of the present invention and the uses to which it may be put as well as the devices to which it may be applied will be clear from the description which follows and the drawing appended thereto, in which drawing, reference characters are used to designate similar parts.

Fig. 1 is a schematic elevation of the temperature responsive mechanism of our invention.

Fig. 2 is an exaggerated schematic illustration of the expansion characteristics of the temperature responsive mechanism according to our invention.

Referring now to the drawing, we have there illustrated a thermostat which as a unit may be secured in any suitable manner to a surface 14, of the device, the temperature of which is to be regulated.

The temperature responsive mechanism according to our invention, of a thermostat unit 10, is provided with the flat bar 12, of metal, having a relatively high coefficient of expansion, such as brass or aluminum, which bar is mounted on, in contact with the surface 14.

In the illustration, the control operating member 24, which is flexed by the expansion of the linearly expanding member is secured at the ends of its legs 26 and 28, preferably as by spot welding to the linearly expansible member 12.

The member 24, is collapsed or flexed by the outward pull on toes 108 and 110, imposed thereon by the expansion of the bar 12, to which they have been secured as by the welds 118, to thereby separate the legs and lower the center portion of the member which opens the switch means. The member 24, in the embodiment illustrated, has at the ends of its legs 26 and 28, sharp bends which form the toes 108 and 110.

As a result, the legs 26 and 28, will flex or curve concavedly adjacent their connection and curve convexedly upward at the toe ends as illustrated by the broken lines in Fig. 2.

This further adds to the magnitude of the downward movement for a given expansion of the bar 12, making the thermostat the more sensitive.

In this construction, the flexed member 24, positively moves the arm 144, down as the member is collapsed or flexed by the expansion of the bar 12, to which the toe elements 108 and 110 of the legs 26 and 28 are secured.

The arm 144 is normally tensioned against the member 24 in the crotch formed where the inclined legs 26 and 28 meet and may be operatively connected to a valve, indicator, relay, etc., to operate it.

Any suitable conventional tension means and construction which will urge the arm 144 in the normal position illustrated may be used and since it forms no part of our invention details thereof need not be given, a spring and pivot connection to the arm, serving as an example.

As the bar 12, which is in good thermal contact with the device, with which the thermostat is associated, expands, the arm 144 is positively operated by the thereby flexed member 24, to open or close a valve, operate a relay or indicator, etc.

Upon cooling, the bar 12 contracts, returning the member 24 to its original shape and position thereby permitting the tensioned arm 144 to return to its normal position.

As illustrated in the schematic drawing of Fig. 2, the central portion of the member 24 at line of bend F, is drawn downwardly from F to G by the expansion of the expansible member from H to I, the legs also flexing along the concavo-convex curve at J, because originally they were straight and the spring member sharply bent at its centre and at the toes and which assumed curvilinear shape also adds to the multiplied lowering of the line of bend.

The relative dimensions of the various elements of the temperature responsive mechanism used with any embodiment of our invention will vary in practice.

It will be seen that we have provided a sensitive thermostat in which a relatively small linear movement of a heat expanded member is translated into a comparatively greater, multiplied or magnified movement of the member controlling the operation of the device.

It is further apparent that we have provided a thermostat in which the temperature responsive mechanism comprises a member that readily expands or contracts under the influence of changes in temperature to flex a second member which is spaced from it except at its ends, to thereby operate a control.

It is still further apparent that we have provided a simple, rugged, self-contained, compact and relatively small thermostat that is reliable in operation and readily adjustable.

While we have illustrated a specific embodiment of our invention, we do not intend to be limited to the specific details shown, but intend to claim our invention as broadly as the prior art and the scope of the appended claim permit.

We claim:

In a thermostat a linearly expansible and contractible bar having a relatively high coefficient of expansion, a spring member having a lower coefficient of expansion, said spring member being sharply bent at its center in the form of a crotch and having a straight leg extending from each side of the crotch to the bar, each leg terminating at the end in a sharply bent toe secured in flat engagement on an end of the bar and an element arranged in the crotch and tensioned against the spring member, said element being movable with the spring member upon the expansion and contraction of the bar, each leg of the spring member being normally straight at one temperature and under expansion of the bar with increase in temperature being convexly curved adjoining the toes and concavely curved adjoining the crotch, thereby effecting magnified movement of the crotch toward the bar and whereby relatively small linear expansion of the bar is translated into greater amplified movement at the crotch for accomplishing a sensitive, more rapid action of the element controlled by said crotch.

References Cited in the file of this patent

UNITED STATES PATENTS

| | | |
|---|---|---|
| 998,177 | Ozias | July 18, 1911 |
| 2,248,666 | Fischer | July 8, 1941 |
| 2,287,177 | Joesting | June 23, 1942 |

FOREIGN PATENTS

| | | |
|---|---|---|
| 490,158 | Germany | Jan. 24, 1930 |